United States Patent
Ishikawa

(10) Patent No.: US 9,797,406 B2
(45) Date of Patent: Oct. 24, 2017

(54) MOTOR DEVICE

(71) Applicant: NIDEC SERVO CORPORATION, Kiryu-shi, Gumma (JP)

(72) Inventor: Masatomo Ishikawa, Kiryu (JP)

(73) Assignee: Nidec Servo Corporation, Gumma (JP)

( * ) Notice: Subject to any disclaimer, the term of this patent is extended or adjusted under 35 U.S.C. 154(b) by 33 days.

(21) Appl. No.: 14/616,960

(22) Filed: Feb. 9, 2015

(65) Prior Publication Data
US 2015/0226228 A1 Aug. 13, 2015

(30) Foreign Application Priority Data
Feb. 10, 2014 (JP) .................. 2014-023441

(51) Int. Cl.
H02P 21/00 (2016.01)
F04D 27/00 (2006.01)
H02P 21/26 (2016.01)
H02P 21/18 (2016.01)

(52) U.S. Cl.
CPC ............ *F04D 27/004* (2013.01); *H02P 21/18* (2016.02); *H02P 21/26* (2016.02)

(58) Field of Classification Search
CPC ..................................... H02P 29/50
USPC ................. 318/400.01, 685, 807; 700/70
See application file for complete search history.

(56) References Cited

U.S. PATENT DOCUMENTS

| 2004/0122536 A1* | 6/2004 | Saitou | F15B 9/09 700/70 |
| 2006/0043923 A1* | 3/2006 | Baker | H02P 21/06 318/807 |
| 2008/0211446 A1* | 9/2008 | Kobayashi | H02P 29/50 318/611 |
| 2008/0272730 A1* | 11/2008 | Hoda | H02P 8/14 318/685 |
| 2009/0104034 A1* | 4/2009 | Takada | H02P 6/085 416/61 |
| 2011/0000652 A1 | 1/2011 | Takada | |

FOREIGN PATENT DOCUMENTS

JP  2004-096979 A  3/2004
JP  2008-043083 A  2/2008

* cited by examiner

*Primary Examiner* — Eduardo Colon Santana
*Assistant Examiner* — Cortez Cook
(74) *Attorney, Agent, or Firm* — Keating & Bennett, LLP

(57) ABSTRACT

A motor device configured to convey a fluid by driving a fan with a motor includes a position/speed acquirer configured to acquire a current rotation angle and a current rotation speed of the motor, a multiplier configured to calculate a flow-rate-constant target driving current by multiplying the rotation speed and a flow rate coefficient, and a current controller configured or programmed to control a motor driving current by setting, as a control target, the flow-rate-constant target driving current and to control a flow rate of the fluid to be maintained at a constant value which depends on the flow rate coefficient.

4 Claims, 4 Drawing Sheets

MOTOR DEVICE

BACKGROUND OF THE INVENTION

1. Field of the Invention

The present invention relates to a motor device preferably for use in, e.g., a blower installed in a duct and, more particularly, to a motor device configured to drive a motor to maintain an air quantity or a flow rate at a constant value.

2. Description of the Related Art

In the related art, a blower is extensively used in different fields. For example, in a ceiling-embedded ventilation system, an indoor air is ventilated by a blower through a duct. In this ventilation system, the load of the blower is changed by the contamination of the duct or the contamination of a filter installed within the duct. International Publication Nos. 2007/040180 and 2009/110219 disclose a configuration in which the fluctuation of a flow rate (or an air quantity) attributable to the change in load is suppressed by calculating an air quantity from a rotation speed of a motor and a driving current and controlling the operation of the motor based on the air quantity thus calculated. Japanese Patent Application Publication No. 2008-43083 discloses a configuration in which a motor is driven by detecting a rotation position of a rotor using a driving current without additionally installing a sensor for detecting a rotation position of a rotor (in a so-called sensorless manner).

With regard to the control of the motor for the blower or the like, Japanese Patent No. 3653670 discloses a configuration in which a motor is controlled by what is called vector control.

When driving the motor for the blower or the like, it would be convenient if the motor can be driven by a process simpler than those in the related arts such that the flow rate is kept constant.

SUMMARY OF THE INVENTION

In accordance with preferred embodiments of the present invention, an air quantity Q can be kept constant by controlling a rotation speed $\omega_e$ and a q-axis driving current $i_q$ to be proportional to each other by paying attention to the relationship between the air quantity Q, the rotation speed $\omega_e$ and the q-axis driving current $i_q$ in a motor device configured to drive a motor through vector control, for example, a motor device for use in a blower.

In an illustrative preferred embodiment of the present invention, a motor device includes a position/speed acquirer configured to acquire a current rotation angle and a current rotation speed of the motor; a multiplier configured to calculate a flow-rate-constant target driving current by multiplying the rotation speed acquired in the position/speed acquirer and a flow rate coefficient; and a current controller configured or programmed to control a motor driving current by setting, as a control target, the flow-rate-constant target driving current and to control a flow rate of the fluid to be maintained at a constant value which depends on the flow rate coefficient.

The current controller includes a current sensor configured to detect the motor driving current; a Clarke transformer configured to Clarke-transform the motor driving current and to generate an output; a Park transformer configured to Park-transform the output of the Clarke transformer based on the rotation angle acquired in the position/speed acquirer and to generate an output; a subtractor configured to calculate a difference value between the flow-rate-constant target driving current and the output of the Park transformer and to generate an output; a controller configured or programmed to generate a control value based on the output of the subtractor; an inverse Park transformer configured to inversely Park-transform the control value based on the rotation angle acquired in the position/speed acquirer and to generate an output; an inverse Clarke transformer configured to inversely Clarke-transform the output of the inverse Park transformer and to generate an output; and an inverter configured to drive the motor based on the output of the inverse Clarke transformer.

In accordance with a preferred embodiment of the present invention, the flow-rate-constant target driving current is set by multiplying the current rotation speed and the flow rate coefficient. This makes it possible to drive the motor by vector control using a flow-rate-constant control. As a result, the motor is driven by a process simpler than those of the related arts such that the flow rate is kept constant.

In accordance with preferred embodiments of the present invention, it is possible to drive the motor by a process simpler than those of the related arts such that the flow rate is kept constant.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
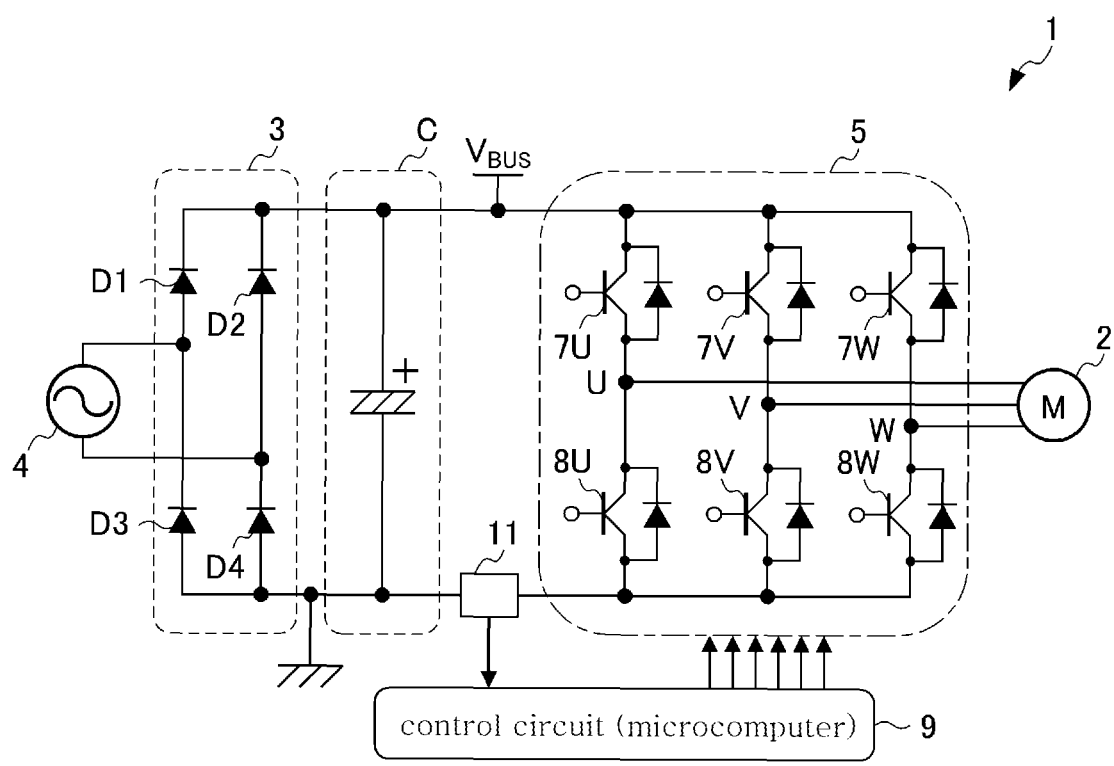
FIG. 1 is a block diagram showing a motor device in accordance with an illustrative preferred embodiment of the present invention.

Illustrative preferred embodiments of the present invention will now be described in detail with reference to the accompanying drawings.

First, description will be made of a motor control principle for keeping an air quantity at a constant value in a blower in accordance with a preferred embodiment of the present invention. When an air quantity (or a flow rate) of an air blown is assumed to be Q, a revolution number of a motor used in blowing an air is assumed to be N [r/min] and an output of the motor is assumed to be P [W], the air quantity Q and the revolution number N is proportional to the output P as represented by the following equation (1).

$$QN^2 \propto P \qquad (1)$$

It can be noted that, in order to keep the air quantity Q constant, $P/N^2$ is controlled to be a constant value. When a coefficient $K_Q$ proportional to the air quantity Q (i.e., $K_Q \propto Q$) is applied, the equation (1) can be modified as represented by the following equation (2).

$$K_Q \cdot N^2 = P \qquad (2)$$

The revolution number N and the output P are converted to physical quantities to be used in vector control. In this regard, the revolution number N can be represented by the following equation (3) using an electrical angular velocity $\omega_e$ [rad/sec] and a pole pair number $P_P$ of a motor.

$$N = \frac{60}{2\pi \cdot p_p} \cdot \omega_e \quad (3)$$

The motor output P can be represented by the following equation (4) using a torque τ generated by a motor and a mechanical angular velocity $\omega_m$ [rad/sec].

$$P = \tau \omega_m \quad (4)$$

In an ordinary brushless DC motor (e.g., a surface-magnet-type permanent magnet synchronous motor), the torque τ can be expressed by the product of a pole pair number $P_P$, a rotor magnetic flux intensity Φ [Vs/rad] and a q-axis driving current $i_q$ as represented by the following equation (5).

$$\tau = p_p \cdot \Phi \cdot i_q \quad (5)$$

The relationship between the mechanical angular velocity $\omega_m$ and the electrical angular velocity $\omega_e$ can be represented by the following equation (6).

$$\omega_m = \frac{1}{p_p} \cdot \omega_e \quad (6)$$

Substituting the equations (5) and (6) to the equation (4), it is possible to obtain the following equation (7).

$$P = \Phi \cdot i_q \cdot \omega_e \quad (7)$$

Substituting the equations (7) and (3) to the equation (2), it is possible to obtain the following equation (8). This makes it possible to obtain the equation of the electrical angular velocity $\omega_e$ and the q-axis driving current $i_q$, which is required to keep the air quantity Q constant.

$$\left(\frac{60}{2\pi \cdot p_p}\right)^2 \cdot \frac{1}{\Phi} \cdot K_Q \cdot \omega_e = i_q \quad (8)$$

The equation (8) can be represented by the following equation (9) using a flow rate coefficient $K'_Q$.

$$K'_Q \cdot \omega_e = i_q \quad (9)$$

The flow rate coefficient $K'_Q$ is given by the following equation (10).

$$K'_Q = \left(\frac{60}{2\pi \cdot p_p}\right)^2 \cdot \frac{1}{\Phi} \cdot K_Q \quad (10)$$

Thus, when the electrical angular velocity $\omega_e$ and the q-axis driving current $i_q$ are controlled to be proportional to each other, it is possible to control the motor at a constant air quantity.

FIG. 1 is a block diagram showing a basic configuration of a motor device 1 in accordance with one preferred embodiment of the present invention. The motor device 1 is preferably applied to, for example, a blower configured to blow air by driving a fan with a three-phase brushless DC motor 2. In the motor device 1, an AC current of an AC power supply 4 is rectified by a rectifier circuit 3 which is a full-wave rectifier circuit using diodes D1 to D4. Then, in the motor device 1, the rectified current is smoothed by a smoothing capacitor C. Thus, the motor device 1 generates a DC power (bus voltage) $V_{BUS}$ and supplies the bus voltage $V_{BUS}$ to an inverter 5.

The inverter 5 includes three sets of serial circuits including driving elements 7U, 7V, 7W, 8U, 8V, and 8W such as FETs (Field Effect Transistors) or the like. The inverter 5 is set such that a driving current is detected by a current sensor 11. The inverter 5 is disposed between the DC power $V_{BUS}$ and the current sensor 11. In the inverter 5, the connection midpoints of the respective serial circuits are respectively connected to U-phase, V-phase, and W-phase coils of a motor 2. The current sensor 11 is connected to a ground line. In the inverter 5, the bases (gates) of the respective driving elements 7U, 7V, 7W, 8U, 8V, and 8W are driven by a driving circuit not shown. Thus, the motor 2 is driven by the output voltages of the driving elements 7U, 7V, 7W, 8U, 8V, and 8W. The current sensor 11 is disposed between the inverter 5 and the ground line to detect the driving currents of the respective phases of the motor 2. Protection-purpose diodes are preferably respectively provided in the driving elements 7U, 7V, 7W, 8U, 8V, and 8W.

In the motor device 1, a low-voltage DC current is generated from the AC power supply by a power supply circuit (not shown) and is inputted to a control circuit 9 including a microcomputer. The control circuit 9 is configured to acquire a driving current of the motor 2 from the current sensor 11. The control circuit 9 determines a driving voltage of the motor 2 by virtue of vector control calculation based on the current information, thus controlling the operation of the inverter 5.

Figure 2:
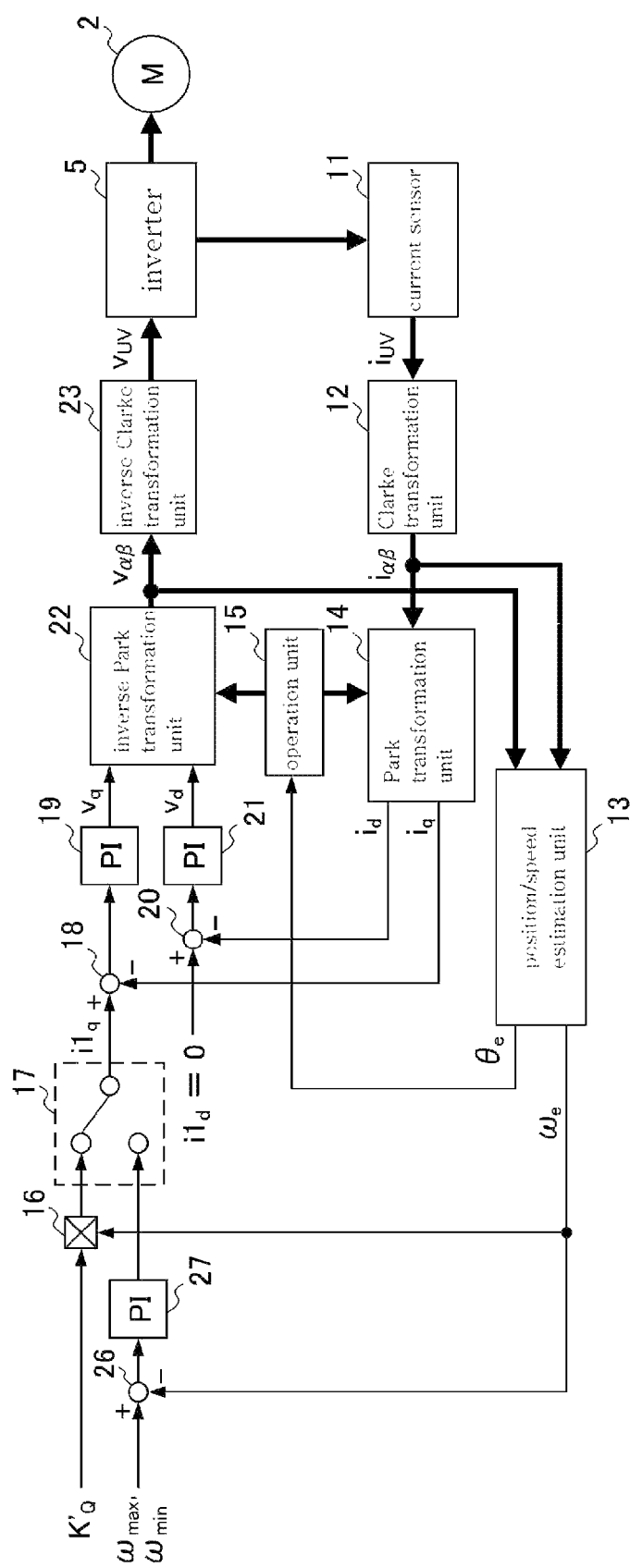
FIG. 2 is a detailed block diagram of the motor device shown in FIG. 1.

FIG. 2 is a block diagram showing the functional blocks configured according to a processing sequence of the control circuit, together with peripheral configurations. By virtue of this configuration of the function blocks, the control circuit 9 drives the motor 2 by using a sensorless vector control method.

That is to say, in the motor device 1, the driving current $i_{UV}$ of the respective phases detected by the current sensor 11 are inputted to a Clarke transformer 12. The Clarke transformer 12 is configured to Clarke-transform the driving current $i_{UV}$ detected by the current sensor 11 and, therefore, outputs a driving current vector iαβ of a two-phase fixed coordinate system. A position/speed estimator 13 is configured to estimate and calculate a rotation angle $\theta_e$ and an electrical angular velocity $\omega_e$ of a rotor from a driving voltage vector Vαβ of a two-phase fixed coordinate system corresponding to the driving current vector iαβ of the two-phase fixed coordinate system. Then the position/speed estimator 13 outputs the rotation angle $\theta_e$ and an electrical angular velocity we. Thus, the position/speed estimator 13 is configured to acquire a current rotation angle and a current rotation speed of the motor 2.

An operator 15 is configured to calculate and output a sine value and a cosine value of the rotation angle $\theta_e$ calculated in the position/speed estimator 13. A Park transformer 14 Park-transforms the driving current vector iαβ of the two-phase fixed coordinate system by using the calculation result of the operator 15. Thus, the Park transformer 14 transforms the driving current vector iαβ into a q-axis driving current $i_q$ and a d-axis driving current $i_d$ and outputs the q-axis driving current $i_q$ and the d-axis driving current $i_d$ thus transformed.

In the motor device 1, the flow rate coefficient $K'_Q$ of the equation (9) is inputted from a host controller or the like as an air quantity control target value. A multiplier 16 is configured to multiply the flow rate coefficient $K'_Q$ and the electrical angular velocity $\omega_e$ calculated in the position/speed estimator 13. Thus, the motor device 1 calculates, as a control target driving current, an air-quantity-constant target driving current value $i1_q$ by executing multiplying in the left-hand side of the equation (9). The air-quantity-constant target driving current value $i1_q$ is outputted to a subtraction circuit 18 through a switch 17. The subtraction circuit 18 is configured to subtract the q-axis driving current $i_q$ calculated in the Park transformer 14 from the output value of the switch 17 and outputs the subtracted value.

A PI controller (PI) 19 is configured to amplify the output value of the subtraction circuit 18 by a predetermined gain and calculates a moving integral value of the output value of the subtraction circuit 18. Thereafter, the PI controller (PI) amplifies the moving integral value by a predetermined gain and adds the amplified moving integral value, thus calculating a q-axis driving voltage $V_q$ which becomes a control value for proportional integral control. A subtraction circuit 20 is configured to calculate and output a subtracted value which is obtained by subtracting the d-axis driving current $i_d$ calculated in the Park transformer 14 from the corresponding control target value $i1_d$ (0 in this example). A PI controller (PI) 21 is configured to calculate and output a d-axis driving voltage $V_d$ which becomes a control value for proportional integral control by using the output of the subtraction circuit 20.

An inverse Park transformer 22 is configured to inversely Park-transform the q-axis driving voltage $V_q$ and the d-axis driving voltage $V_d$ outputted from the PI controllers (PI) 19 and 21 by using the calculation result of the operator 15 and outputs a driving voltage vector $V\alpha\beta$ of a two-phase fixed coordinate system. An inverse Clarke transformer 23 is configured to inversely Clarke-transform the driving voltage vector $V\alpha\beta$ of the two-phase fixed coordinate system outputted from the inverse Park transformer 22 and outputs a driving voltage vector $V_{UVW}$ of a three-phase fixed coordinate system. The motor device 1 pulse-width-modulates the driving voltage vector $V_{UVW}$ of the three-phase fixed coordinate system outputted from the inverse Clarke transformer 23 and applies the pulse-width-modulated driving voltage vector $V_{UVW}$ to the coils of the motor 2, thus driving the motor 2.

Figure 3:
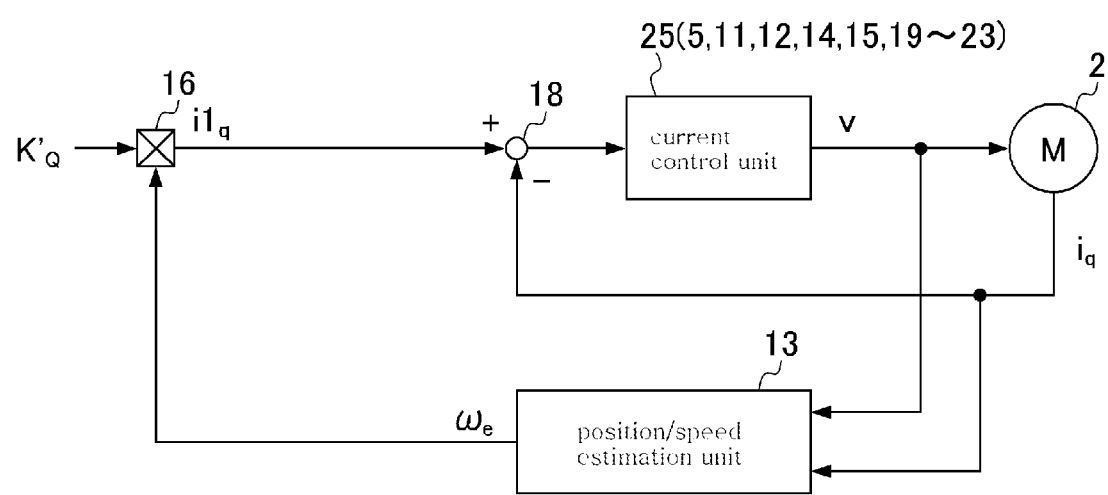
FIG. 3 is a view used in describing the block diagram shown in FIG. 2.

Accordingly, in the motor device 1, as can be seen in FIG. 3 which shows the configuration of FIG. 2 in a simplified manner, a multiplied value of the flow rate coefficient $K'_Q$ inputted from a host controller or the like and the electrical angular velocity $\omega_e$ becomes an air-quantity-constant q-axis target driving current $i1_q$. By performing feedback control such that the driving current $i_q$ coincides with the air-quantity-constant q-axis target driving current $i1_q$, a current controller (preferably defined by all of the above-described components corresponding to reference characters 5, 11, 12, 14, 15, and 19 through 23) of the motor device 1 drives the motor 2 to maintain the equation (9). Thus, the motor device 1 drives the motor 2 by virtue of an air-quantity-constant control.

When driving the motor 2, it is preferable to set a lower limit value and an upper limit value of a rotation speed. That is to say, during low-speed rotation and light-load rotation, the driving current and the driving voltage of the motor 2 are low. Thus, the accuracy of estimation of a rotation position and a rotation speed is reduced. This makes it difficult to stably drive the motor 2. Accordingly, there is a need to set the lower limit value. Furthermore, in order to protect the circuit and the motor from heat or vibration during high-speed rotation of the motor, it is also preferable to set the upper limit value.

For that reason, in the motor device 1 (see FIG. 2), a speed control target value selected from a speed upper limit value $\omega_{max}$ and a speed lower limit value $\omega_{min}$ is inputted to a subtraction circuit 26. The subtraction circuit 26 is configured to calculate a subtracted value obtained by subtracting the electrical angular velocity $\omega_e$ estimated in the position/speed estimator 13 from the speed control target value. The subtracted value thus calculated is inputted to a PI controller 27 which in turn is configured to calculate a speed-constant q-axis target driving current $i1_q$ by a proportional integral control. The PI controller 27 is configured to output the calculation result to the switch 17. In the motor device 1, the electrical angular velocity $\omega_e$ estimated in the position/speed estimator 13 is used in determination by a determiner (not shown). The speed control target value is changed and the operation of the switch 17 is switched depending on the determination result, such that the control of the motor 2 is switched between the air-quantity-constant control and a speed-constant control. In this way, the motor 2 is driven such that the rotation speed of the motor 2 should not become lower than the lower limit value or higher than the upper limit value.

More specifically, if the electrical angular velocity $\omega_e$ estimated in the position/speed estimator 13 becomes higher than the upper limit value $\omega_{max}$ while the multiplied value in the multiplier 16 is outputted to the subtraction circuit 18 through the switch 17 to drive the motor 2 under the air-quantity-constant control, the determiner sets the speed control target value at the upper limit value $\omega_{max}$. Along with the setting of the speed control target value, the determiner switches the operation of the switch 17 and outputs the output value of the PI controller 27 to the subtraction circuit 18. Thus, the control of the motor 2 is switched from the air-quantity-constant control to the speed-constant control, thus maintaining the rotation speed of the motor 2 at the upper limit value $\omega_{max}$.

If the speed-constant q-axis target current $i1_q$ outputted from the PI controller 27 becomes equal to or larger than a multiplied value $K'_Q \cdot \omega_e$ of the electrical angular velocity $\omega_e$ estimated in the position/speed estimator 13 and the flow rate coefficient $K'_Q$ while the rotation speed of the motor 2 is maintained at the upper limit value $\omega_{max}$ by the speed-constant control, the multiplied value at the multiplier 16 is outputted to the subtraction circuit 18 through the switch 17. Thus, the motor 2 is driven under the air-quantity-constant control. That is to say, the control of the motor 2 is switched from the speed-constant control to the air-quantity-constant control by the switch 17.

If the electrical angular velocity $\omega_e$ estimated in the position/speed estimator 13 becomes lower than the lower limit value $\omega_{min}$ while the motor is driven under the air-quantity-constant control, the speed control target value is set at the lower limit value $\omega_{min}$ and the operation of the switch 17 is switched such that the output value of the PI controller 27 is outputted to the subtraction circuit 18. Thus, the control of the motor 2 is switched from the air-quantity-constant control to the speed-constant control, thus maintaining the rotation speed of the motor 2 at the lower limit value $\omega_{min}$.

If the speed-constant q-axis target current $i1_q$ outputted from the PI controller 27 becomes smaller than the multiplied value $K'_Q \cdot \omega_e$ of the electrical angular velocity $\omega_e$ estimated in the position/speed estimator 13 and the flow rate coefficient $K'_Q$ while the rotation speed of the motor 2 is maintained at the lower limit value $\omega_{min}$ by the speed-constant control, the multiplied value in the multiplier 16 is outputted to the subtraction circuit 18 through the switch 17.

Thus, the motor 2 is driven under the air-quantity-constant control. That is to say, the control of the motor 2 is switched from the speed-constant control to the air-quantity-constant control by the switch 17.

When switching the drive under the air-quantity-constant control and the drive under the speed-constant control using the upper limit value and the lower limit value of the rotation speed, there may be provided hysteresis characteristics.

Figure 4:
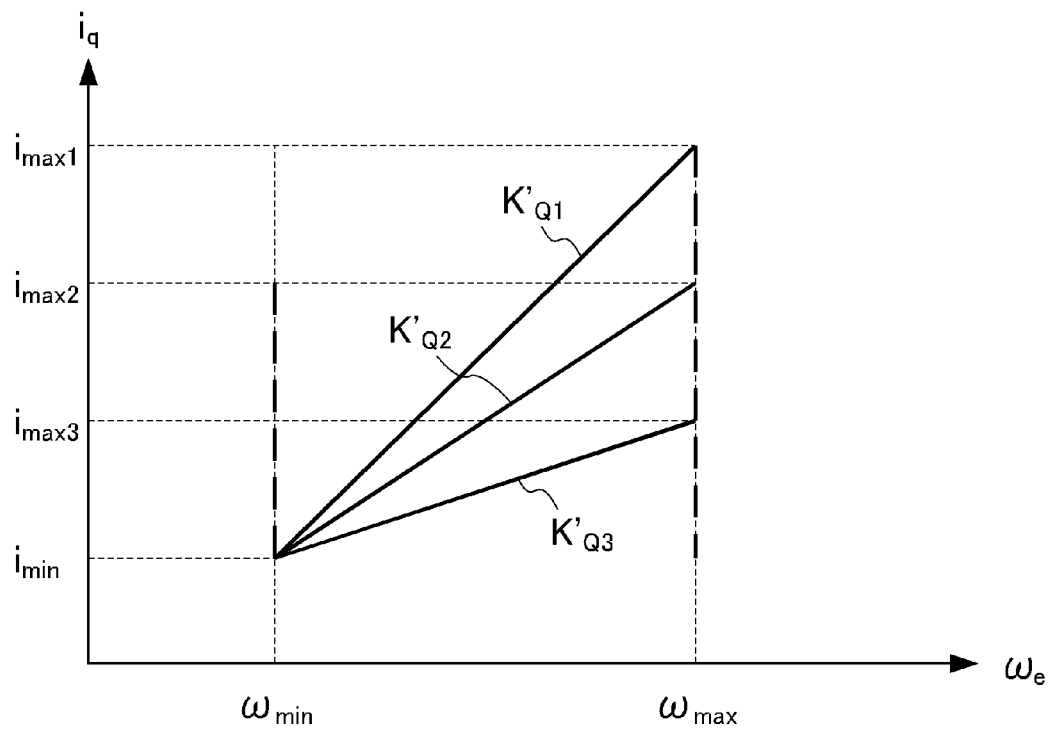
FIG. 4 is a characteristic curve diagram showing control characteristics according to a preferred embodiment of the present invention.

FIG. 4 is a characteristic curve diagram showing control characteristics of the motor device 1 according to the switching of the drive. When driving the motor 2 under the air-quantity-constant control, the motor 2 is driven by the driving current depending on the proportional coefficient corresponding to the flow rate coefficient $K'_Q$ and by the characteristics of the rotation speed (see the range indicated by solid lines). In this state, e.g., if a static pressure of a flow path grows higher, the rotation speed of the motor 2 becomes higher in order to keep the air quantity constant. In this case, if the rotation speed of the motor 2 exceeds the upper limit value, the drive of the motor 2 is switched to the speed-constant control, thus driving the motor 2 at the upper limit value (see the range indicated by the broken lines). If the static pressure of the flow path grows lower while the motor 2 is driven at the upper limit value of the rotation speed under the speed-constant control, the load of the motor 2 becomes larger and the driving current increases. In this case, if the driving current becomes larger than the multiplied value of the flow rate coefficient and the rotation speed, the drive of the motor 2 is switched to the previous air-quantity-constant control drive.

If the static pressure of the flow path grows lower during the air-quantity-constant control drive, the rotation speed of the motor 2 decreases in order to keep the air quantity constant. In this case, if the rotation speed of the motor 2 is lower than the lower limit value, the drive of the motor 2 is switched to the speed-constant control drive. Thus, the motor 2 is driven at the lower limit value (see the range indicated by broken lines). If the static pressure of the flow path grows higher while the motor 2 is driven at the lower limit value of the rotation speed under the speed-constant control, the load of the motor 2 becomes smaller and the driving current decreases. In this case, if the driving current becomes smaller than the multiplied value of the flow rate coefficient and the rotation speed, the drive of the motor 2 is switched to the previous air-quantity-constant control drive.

In accordance with preferred embodiments of the present invention, the motor preferably is driven by vector control. The target driving current is calculated by multiplying the current rotation speed and the flow rate coefficient. Feedback control is performed such that the actual driving current is controlled to coincide with the target driving current. As a result, the motor preferably is driven by a process simpler than that of the related art such that the air quantity is kept constant.

Furthermore, it is possible to set the air quantity at a desired quantity by adjusting the flow rate coefficient. The flow rate coefficient may be adjusted by, e.g., installing a volume switch within the motor device and operating the volume switch. Alternatively, the magnitude of the air quantity may be instructed by a host controller or the like.

By determining the upper limit value and the lower limit value of the rotation speed with the determiner and switching the control of the motor, it is possible to drive the motor such that the rotation speed thereof does not become higher than the upper limit value or lower than the lower limit value.

While a detailed description of one preferred embodiment of the present invention has been described above, the present invention is not limited thereto but may be modified in many different forms without departing from the spirit and scope of the invention.

For example, in the aforementioned preferred embodiment, description has been made of a case where the position/speed estimator 13 preferably is provided to acquire the rotation angle and the rotation speed of the motor and where the rotation angle and the rotation speed are acquired by estimation and calculation based on the driving current and the driving voltage. However, the present invention is not limited thereto. As an example, a position sensor such as, for example, an encoder, a resolver, or the like may be provided to acquire the rotation angle and the rotation speed of the motor. The rotation angle and the rotation speed may be acquired by processing the detection result of the position sensor.

In the aforementioned preferred embodiment, description has been made of a case where the present invention is preferably applied to the blower configured to blow air by driving a fan. However, the present invention is not limited thereto. As an example, the present invention may be extensively applied to a case where a liquid is conveyed by driving a fan (impeller). This makes it possible to drive the fan (impeller) under flow-rate-constant control.

In the aforementioned preferred embodiment, description has been made of a case where the fan motor preferably is driven by the three-phase brushless motor. However, the present invention is not limited thereto. As an example, the present invention may be applied to a case where different kinds of motors other than the fan motor are driven.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor device which conveys a fluid by driving a fan with a motor, the motor device comprising:
    a position/speed acquirer configured to acquire a current rotation angle and a current rotation speed of the motor;
    a multiplier configured to calculate a flow-rate-constant target driving current by multiplying the rotation speed acquired in the position/speed acquirer and a flow rate coefficient;
    and a current controller configured to control a motor driving current by setting, as a control target, the flow-rate-constant target driving current and to control a flow rate of the fluid to be maintained at a constant value which depends on the flow rate coefficient, where in the current controller includes:
    a current sensor configured to detect the motor driving current;
    a Clarke transformer configured to Clarke-transform the motor driving current and to generate an output;
    a Park transformer configured to Park-transform the output of the Clarke transformer and the rotation angle acquired in the position/speed acquirer and to generate an output;

a subtractor configured to calculate a difference value between the flow-rate-constant target driving current and the output of the Park transformer and to generate an output;

a controller configured to generate a control value based on the output of the subtractor;

an inverse Park transformer configured to inversely Park-transform the control based on the rotation angle acquired in the position/speed acquirer and to generate an output;

an inverse Clarke transformer configured to inversely Clarke-transform the output of the inverse Park transformer and to generate an output;

and an inverter configured to drive the motor based on the output of the inverse Clarke transformer, the device further comprising: a determiner configured to determine the rotation speed of the motor based on an upper limit determination reference value and a lower limit determination reference value;

wherein when the determination result of the determiner reveals that the rotation speed of the motor is higher than the upper limit determination reference value, instead of the flow-rate-constant target driving current, a speed-constant target driving current calculated by a difference value between an upper limit rotation speed and the rotation speed acquired in the position/speed acquirer is set as the control target to thus drive the motor at the upper limit rotation speed;

and when the determination result of the determiner reveals that the rotation speed of the motor is lower than the lower limit determination reference value, instead of the flow-rate-constant target driving current, a speed-constant target driving current calculated by difference value between a lower limit rotation speed and the rotation speed acquired in the position/speed acquirer is set as the control target to thus drive the motor at the lower limit rotation speed.

2. The device of claim 1, wherein the position/speed acquirer includes a position sensor configured to acquire the rotation angle and the rotation speed.

3. The device of claim 1, wherein the flow rate of the fluid is changed by receiving the setting of the flow rate coefficient.

4. The device of claim 2, wherein the flow rate of the fluid is changed by receiving the setting of the flow rate coefficient.

* * * * *